(12) United States Patent
Butterfield et al.

(10) Patent No.: US 12,375,538 B2
(45) Date of Patent: Jul. 29, 2025

(54) AMBIENT, AD HOC, MULTIMEDIA COLLABORATION IN A GROUP-BASED COMMUNICATION SYSTEM

(71) Applicant: Salesforce, Inc., San Francisco, CA (US)

(72) Inventors: Daniel Stewart Butterfield, San Francisco, CA (US); Tamar Yehoshua, San Francisco, CA (US); Noah Weiss, San Francisco, CA (US); John Rodgers, Vancouver (CA); Kevin Marshall, Mill Valley, CA (US); Anna Niess, Hastings-on-Hudson, NY (US); Pedro Carmo, Brooklyn, NY (US); Ethan Eismann, Orinda, CA (US); Chris Willmore, Alameda, CA (US); David Ly-Gagnon, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1014 days.

(21) Appl. No.: 17/408,024

(22) Filed: Aug. 20, 2021

(65) Prior Publication Data

US 2022/0109707 A1    Apr. 7, 2022

Related U.S. Application Data

(63) Continuation-in-part of application No. 17/064,344, filed on Oct. 6, 2020, now Pat. No. 11,140,203.

(51) Int. Cl.
*H04L 65/403* (2022.01)
*G06F 3/0482* (2013.01)

(52) U.S. Cl.
CPC .......... *H04L 65/403* (2013.01); *G06F 3/0482* (2013.01)

(58) Field of Classification Search
None
See application file for complete search history.

(56) References Cited

U.S. PATENT DOCUMENTS 6,564,246 B1    5/2003    Varma et al.
8,467,354 B1    6/2013    Jerkunica et al.
(Continued)

FOREIGN PATENT DOCUMENTS

CN    1472962 A    2/2004
CN    103346953 A    10/2013
(Continued)

OTHER PUBLICATIONS

PCT Patent Application PCT/US2020/065356 International Preliminary Report on Patentability and Written Opinion of the International Searching Authority, issued Mar. 28, 2023.
(Continued)

*Primary Examiner* — Quang N Nguyen
(74) *Attorney, Agent, or Firm* — Lee & Hayes, P.C.

(57) ABSTRACT

Media, methods, and systems are disclosed for ad hoc, ambient, synchronous multimedia collaboration in a group-based communication system. Embodiments of the invention provide a way for users to quickly discover and initiate real-time collaboration sessions among groups of other users without the burden and overhead of a conventional call or video meeting. Users can quickly and easily discover and switch into and out of these synchronous multimedia collaboration sessions at any time, without disrupting the sessions for other participating users. This enables a diverse set of users to experience a rich multimedia collaboration session collaboration as a convenient ad hoc forum rather than a burdensome scheduled event.

20 Claims, 8 Drawing Sheets

(56) References Cited

U.S. PATENT DOCUMENTS

| | | | |
|---|---|---|---|
| 8,997,007 B1* | 3/2015 | Bennett | H04N 21/41407 |
| | | | 715/753 |
| 9,294,522 B1 | 3/2016 | Yeskel et al. | |
| 9,538,223 B1* | 1/2017 | Dahley | H04N 7/147 |
| 10,560,662 B1 | 2/2020 | Tippana | |
| 11,481,236 B1* | 10/2022 | Weiss | G06F 9/52 |
| 2002/0122391 A1 | 9/2002 | Shalit | |
| 2004/0199580 A1 | 10/2004 | Zhakov et al. | |
| 2005/0259145 A1 | 11/2005 | Schrader et al. | |
| 2006/0010197 A1 | 1/2006 | Ovenden | |
| 2006/0026502 A1 | 2/2006 | Dutta | |
| 2006/0136441 A1 | 6/2006 | Fujisaki | |
| 2006/0223563 A1 | 10/2006 | Sung et al. | |
| 2009/0055483 A1 | 2/2009 | Madan et al. | |
| 2011/0119597 A1 | 5/2011 | Yellamraju et al. | |
| 2012/0331402 A1 | 12/2012 | Hon et al. | |
| 2013/0332179 A1 | 12/2013 | Girard | |
| 2015/0078374 A1 | 3/2015 | Pulhug | |
| 2016/0028784 A1 | 1/2016 | Gupta et al. | |
| 2016/0112521 A1 | 4/2016 | Lawson et al. | |
| 2016/0344777 A1* | 11/2016 | Fahlgren | H04L 65/1073 |
| 2017/0063749 A1 | 3/2017 | Gupta et al. | |
| 2017/0142170 A1 | 5/2017 | Sylvain | |
| 2017/0171253 A1 | 6/2017 | Pierce et al. | |
| 2017/0180485 A1 | 6/2017 | Lawson et al. | |
| 2018/0287982 A1 | 10/2018 | Draeger et al. | |
| 2019/0075171 A1* | 3/2019 | Childress | H04L 69/14 |
| 2020/0036451 A1 | 1/2020 | Gilson | |
| 2020/0301648 A1 | 9/2020 | Shi et al. | |
| 2021/0203703 A1 | 7/2021 | Meybaum et al. | |
| 2021/0399911 A1 | 12/2021 | Jorasch et al. | |
| 2023/0032159 A1* | 2/2023 | Kalinichenko | H04L 12/1831 |
| 2023/0370507 A1* | 11/2023 | Chang | G06F 3/0482 |
| 2024/0007511 A1 | 1/2024 | Butterfield | |

FOREIGN PATENT DOCUMENTS

| | | |
|---|---|---|
| CN | 105407408 A | 3/2016 |
| JP | 2005084969 A | 3/2005 |
| JP | 2006092337 A | 4/2006 |

OTHER PUBLICATIONS

"Beginner's Guide to Discord," https://support.discord .com/hc/en-us/articles/360045138571-Beginner-s-Guide-to-Discord, pp. 1-17, retrieved Dec. 21, 2023.
Chinese Office Action mailed Sep. 18, 2023 for Chinese Patent Application No. 202080105842.7, a foreign counterpart to U.S. Pat. No. 11,140,203, 10 pages.
Search Report for European Application No. 24175081.9, dated Aug. 7, 2024, 20 pages.
How do I join a Server? https://support.discord.com/hc/en-us/articles/360034842871-How-do-I-join-a-Server-, pp. 1-5, retrieved Dec. 21, 2023.
Japanese Office Action mailed Sep. 5, 2023 for Japanese Patent Application No. 2023-520126, a foreign counterpart to U.S. Pat. No. 11,140,203, 5 pages.
Final Office Action issued Feb. 6, 2023 for U.S. Appl. No. 17/348,123, Daniel Steward Butterfield, "Ambient, Ad Hoc, Multimedia Collaboration in a Group-Based Communication System," 13 pages.
Final Office Action issued Mar. 7, 2022 for U.S. Appl. No. 17/348,123, Daniel Steward Butterfield, "Ambient, Ad Hoc, Multimedia Collaboration in a Group-Based Communication System," 13 pages.
Final Office Action issued Apr. 26, 2021 for U.S. Appl. No. 17/064,344, Daniel Steward Butterfield, "Ambient, Ad Hoc, Multimedia Collaboration in a Group-Based Communication System," 9 pages.
Non-Final Office Action issued Sep. 28, 2022 for U.S. Appl. No. 17/348,123, Daniel Steward Butterfield, "Ambient, Ad Hoc, Multimedia Collaboration in a Group-Based Communication System," 12 pages.

Non-Final Office Action issued Oct. 26, 2021 for U.S. Appl. No. 17/348,123, Daniel Steward Butterfield, "Ambient, Ad Hoc, Multimedia Collaboration in a Group-Based Communication System," 10 pages.
Non-Final Office Action issued Dec. 10, 2020 for U.S. Appl. No. 17/064,344, Daniel Steward Butterfield, "Ambient, Ad Hoc, Multimedia Collaboration in a Group-Based Communication System," 8 pages.
"Sending Messages," https://support.discord.com/hc/en-us/articles/360034632292-Sending-Messages, pp. 1-11, retrieved Dec. 21, 2023.
Canadian Patent Application 3,196,817, Notice of Allowance, issued Jul. 12, 2023.
PCT Patent Application PCT/US2022/031077 International Search Report and Written Opinion issued Sep. 8, 2022.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/

(56) References Cited

OTHER PUBLICATIONS

2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
WIPO Application No. PCT/US2020/065356, International Search Report and Written Opinion of the International Searching Authority, mailed Jun. 8, 2021.
Wikipedia; Clubhouse (app); https://en.wikipedia.org/wiki/Clubhouse_(app); Jul. 14, 2021; pp. 1-14.
Twitter, Inc.; About Twitter Spaces; https://help.twitter.com/en/using-twitter/spaces; Jul. 15, 2021; pp. 1-23.
Office Action for U.S. Appl. No. 18/468,368, dated Mar. 12, 2025, 8 pages.

\* cited by examiner

AMBIENT, AD HOC, MULTIMEDIA COLLABORATION IN A GROUP-BASED COMMUNICATION SYSTEM

RELATED APPLICATIONS

This patent application is a continuation-in-part application claiming priority benefit, with regard to all common subject matter, of U.S. patent application Ser. No. 17/064,344, filed Oct. 6, 2020, issued as U.S. Pat. No. 11,140,203, on Oct. 5, 2021, and entitled "AMBIENT, AD HOC, MULTIMEDIA COLLABORATION IN A GROUP-BASED COMMUNICATION SYSTEM." The above-referenced application is hereby incorporated by reference in its entirety into the present application.

TECHNICAL FIELD

Embodiments of the invention generally relate to multimedia communication, and more particularly, to ad hoc, synchronous, multimedia collaboration in a group-based communication system.

Traditionally, non-in-person collaboration has been divided into asynchronous communication (such as emails and group-based messaging), where a recipient may view a message minutes, days, or months after the sender sends it, and synchronous communication (such as phone calls and video meetings) which occur in real time but must be scheduled in advance. None of these formats can replicate the kind of serendipitous conversations that happen naturally in physical offices. As such, what is needed is ambient, ad hoc, multimedia collaboration that lowers the barrier for spontaneous, real-time collaboration.

SUMMARY

Embodiments of the invention address the above-described need by providing for ambient, ad hoc multimedia collaboration in a group-based communication system. In some embodiments, the group-based communication is a channel-based messaging platform. In particular, in a first embodiment, the invention includes one or more non-transitory computer-readable media storing computer-executable instructions that, when executed by a processor, perform a method for facilitating synchronous multimedia collaboration in a group-based communication system, the method comprising: displaying, in a user interface for the group-based communication system, one or more collaboration affordances associated with one or more collaboration actions associated with a group of collaborating users in the group-based communication system, responsive to receiving a selection of one of the one or more collaboration affordances, initiating, a synchronous multimedia collaboration session between a plurality of participants, and rendering, for display, one or more collaboration panes in the user interface for the group-based communication system, the synchronous collaboration panes displaying a plurality of collaboration components associated with the synchronous multimedia collaboration session, detecting selection of a collaboration component of the plurality of collaboration components, and in response to detecting selection of the collaboration component, rendering, for display, an interactive collaboration user interface associated with the collaboration component in a collaboration pane of the one or more collaboration panes, wherein the interactive collaboration user interface is engageable by one or more participants of the plurality of participants.

In a second embodiment, the invention includes a method for facilitating synchronous multimedia collaboration in a group-based communication system, the method comprising: displaying, in a user interface for the group-based communication system, one or more collaboration affordances associated with one or more collaboration actions associated with a group of collaborating users in the group-based communication system, responsive to receiving a selection of one of the one or more collaboration affordances, initiating, a synchronous multimedia collaboration session between a plurality of participants, and rendering, for display, one or more collaboration panes in the user interface for the group-based communication system, the synchronous collaboration panes displaying a plurality of collaboration components associated with the synchronous multimedia collaboration session, detecting selection of a collaboration component of the plurality of collaboration components, and in response to detecting selection of the collaboration component, rendering, for display, an interactive collaboration user interface associated with the collaboration component in a collaboration pane of the one or more collaboration panes, wherein the interactive collaboration user interface is engageable by one or more participants of the plurality of participants.

In a third embodiment, the invention includes a system comprising at least one processor and at least one non-transitory memory storing computer executable instructions that when executed by the processor cause the system to carry out actions comprising: displaying, in a user interface for the group-based communication system, one or more collaboration affordances associated with one or more collaboration actions associated with a group of collaborating users in the group-based communication system, responsive to receiving a selection of one of the one or more collaboration affordances, initiating, a synchronous multimedia collaboration session between a plurality of participants, and rendering, for display, one or more collaboration panes in the user interface for the group-based communication system, the synchronous collaboration panes displaying a plurality of collaboration components associated with the synchronous multimedia collaboration session, detecting selection of a collaboration component of the plurality of collaboration components, and in response to detecting selection of the collaboration component, rendering, for display, an interactive collaboration user interface associated with the collaboration component in a collaboration pane of the one or more collaboration panes, wherein the interactive collaboration user interface is engageable by one or more participants of the plurality of participants.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
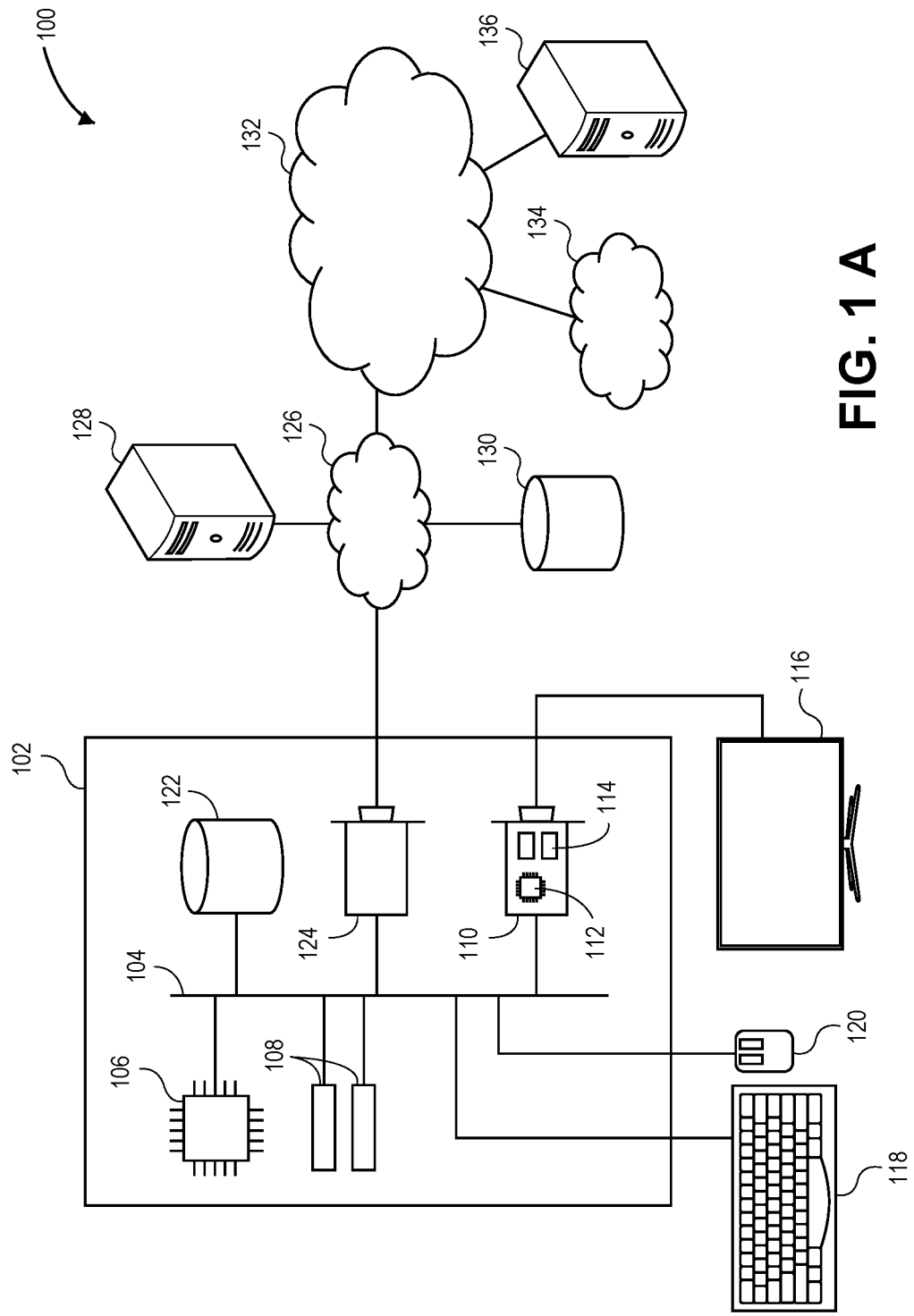
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

At a high level, embodiments of the invention provide for ad hoc, ambient, synchronous, multimedia collaboration. In contrast to conventional audio or video calls, which typically are scheduled with a defined start and end time, embodiments of the invention foster collaboration among users by lowering the barrier to real-time communication, thereby creating opportunities for serendipitous conversations. Users can quickly and easily join and leave these synchronous multimedia collaboration sessions at any time, without disrupting the synchronous multimedia collaboration session for other users. This enables the user to experience the collaboration as a convenient forum rather than a burdensome scheduled event. The ambient nature of such a collaboration space allows users to feel connected to other team members without the need for physical proximity or artificial check-ins.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1A depicts an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
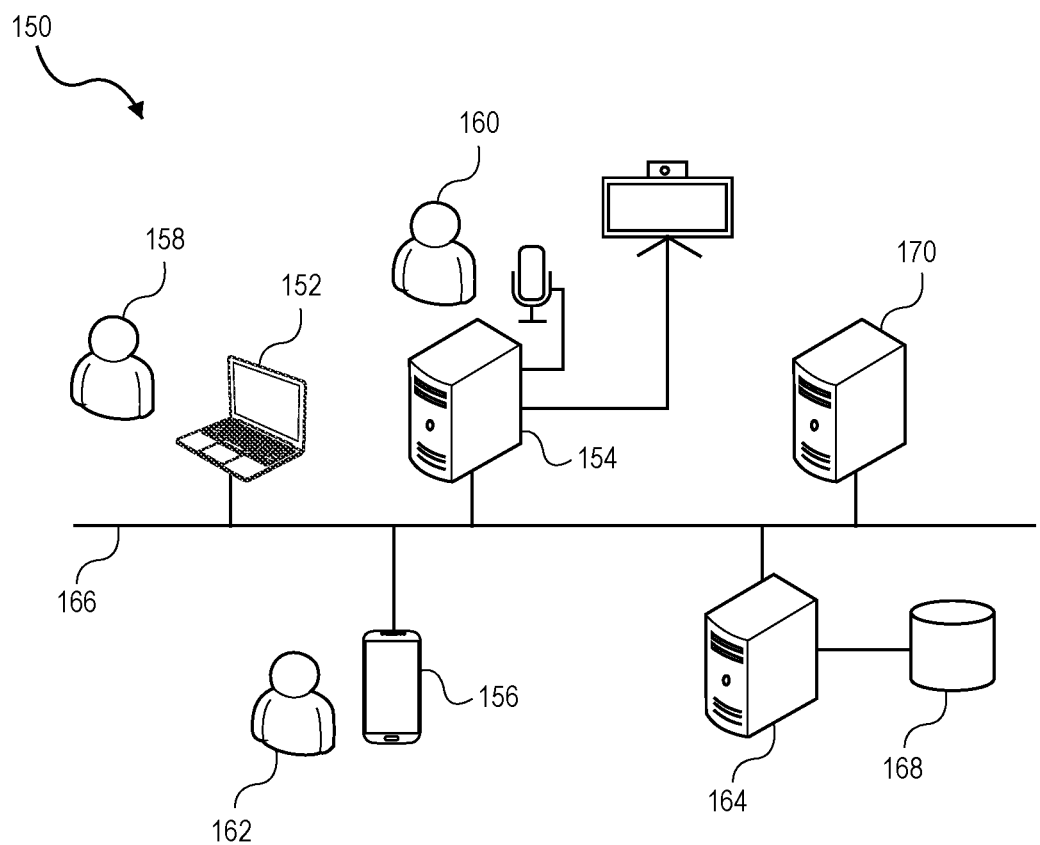
FIG. 1B depicts a system figure illustrating the elements of a system for carrying out embodiments of the invention.

FIG. 1B depicts a system 150 illustrating the elements of a system for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, when synchronous multimedia collaboration sessions are archived (as described in greater detail below), the archived collaboration system data is stored on group-based communication system data store for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time synchronous multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of synchronous multimedia collaboration sessions may be better served by connecting via a different network for part or all of the communicative coupling. For example, a particular client device may normally connect to group-based communication system server 164 via a cellular data connection but switch to a WiFi connection when a synchronous multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
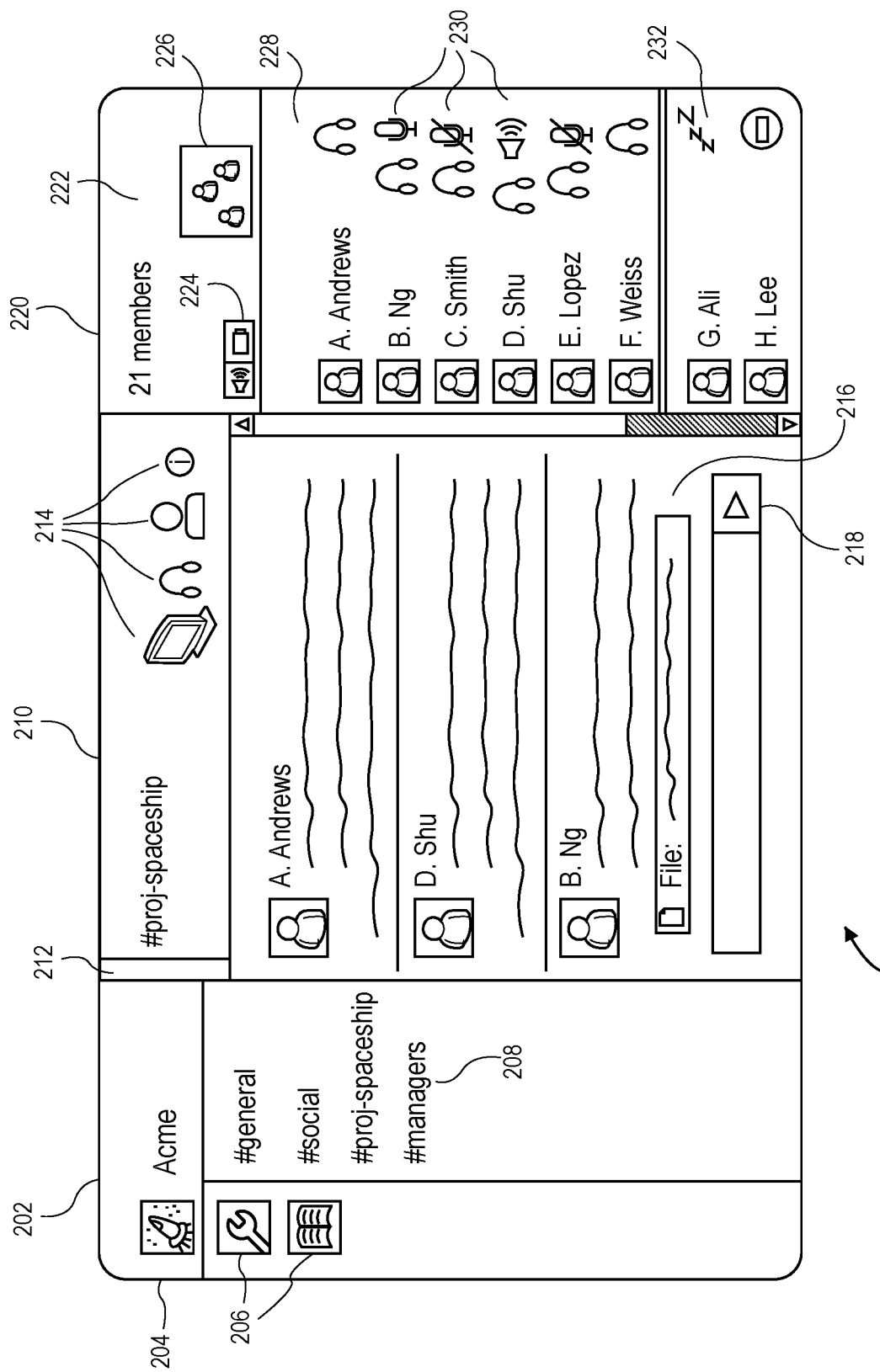
FIG. 2A depicts a user interface depicting a first use case of one embodiment of the invention.

FIG. 2A depicts a user interface 200 depicting a first use case of one embodiment of the invention. User interface 200 depicts a channel in a group-based communication system for asynchronous collaboration among a group of users (also known as members of the channel). Users of the group-based communication system can post messages at any point in time, and other members can view them at their leisure, either in real time or when they next visit the particular channel of the group-based communication system. Typically, non-members of a channel cannot view or otherwise access the channel. In some embodiments, channels may be limited to a single organization or business enterprise, and in other embodiments, channels may also be shared across multiple organizations or business enterprises. Using channels of a group-based communication system provides the benefit of allowing users to focus on particular tasks without being distracted by the need to constantly monitor real-time communications, which facilitates cross-organization collaboration. In such systems, the addition of synchronous multimedia collaboration sessions can help improve team integration and collaboration, both internally to an organization as well as externally. For example, a regularly scheduled, real-time synchronous multimedia collaboration session can help team members better understand what their coworkers are working on. Real-time synchronous multimedia collaboration sessions established in connection with a shared channel can facilitate inter-organization collaboration.

However, formally organized and structured meetings are a poor vehicle for collaboration. Users feel pressured to set aside time for the meeting, prepare for it, and devote their entire attention to the predetermined meeting topic. By contrast, embodiments of the invention allow users to collaborate ambiently, as if they were working together in the same room, but without the need for physical proximity. Integrating such ambient collaboration into the group-based communication system further has the benefit of reducing barriers to initiating a collaboration. Rather than being required to propose a meeting, confirm availability, choose a time, and send invitations, a user can simply start a collaboration with members of the channel with a single button press. Channel members who are available can join the collaboration, join in listen-only mode, or decline to join. In some embodiments, members may join and leave the synchronous multimedia collaboration session at any point in time the synchronous multimedia collaboration session is active.

As depicted, user interface 200 includes a navigation pane 202 for navigating the group-based communication system. For example, navigation pane 202 may include an organization label with one or more workspace labels to allow the user to switch between different organizations using the group-based communication system and different workspaces within an organization. For example, a user may belong to one instance of the group-based communication system associated with their employer and a second instance associated with a volunteer organization to which the user belongs. Within the employer's organization, separate workspaces may exist for product development and product support. The user can switch between organizations by clicking on the organization label, denoted "Acme" or its icon and switch between workspaces with the selected organization using workspace labels 206. Finally, within a workspace, communications may be divided up into channels, with each channel devoted to a particular topic. In some embodiments, user interface 200 includes a channel list 208 to which the user has subscribed or to which the user has access, and the user can switch the current channel view to any channel by selecting that channel in the list. In some embodiments, channel list 208 may include an icon indicating that a particular channel (or channels) has an ongoing synchronous multimedia collaboration session. Thus, navigation page 204 allows a user to easily select a channel across different organizations and workspaces.

Next, user interface 200 includes channel display 210. Channel display 210 includes information relevant to the user's currently selected channel. For example, channel display 210 may include channel header 212, which displays metadata for the currently selected channel, including channel name, channel membership, and channel topic. Channel header 212 may also include controls 214 for starting a synchronous multimedia collaboration session, adding new members to the channel, displaying additional information about the channel, administering the channel, or other channel functions such as initiating application sharing or whiteboard collaboration. Whiteboard collaboration involves placement of shared files on an on-screen shared notebook or whiteboard that can provide teams with a collaborative, creative environment for brainstorming new ideas and solving problems. Many other types of application sharing may also be performed, including use of a shared application such as FIGMA, which is a vector graphics editor and prototyping tool for collaborative interface design. FIGMA can be used to design user interfaces on a variety of computing platforms such as those described in connection with FIG. 1A. Additionally, application sharing can be carried out in connection with a productivity suite such as GOOGLE docs, which provides productivity tools such as a word processor, a spreadsheet, and a presentation application, among other applications. In connection with a shared productivity tool, users can collaboratively work on (e.g., edit) a document simultaneously. Additional application sharing may include collaborative use of a board within slack, sharing files, and sharing media, etc.

In some embodiments, controls 214 for starting the synchronous multimedia collaboration session may be located elsewhere in navigation pane 202 or from a message input box 218 or compose button located in navigation pane 202. In some embodiments, controls 214 further select a sidebar pane (such as synchronous multimedia collaboration session pane 220, discussed in further detail below). In some embodiments, the controls display additional information when the user hovers over them. For example, the "synchronous multimedia collaboration session" control 214 might display a list of members in an ongoing synchronous multimedia collaboration session if the user hovers over it, even when synchronous multimedia collaboration session pane 220 is not displayed. Channel display 210 further includes message display 216, which displays the messages posted in the channel by the members of the channel, notifications for the channel, and other channel data. As depicted, message display 216 shows the most recent messages posted by channel members; however, in some embodiments, messages may be searchable, sortable, and/or scrollable within message display 216. Finally, message display 216 may include a message input box 218 allowing users to post messages to the message display for communication to other channel members.

In some embodiments, replies to group-based communication system messages such as those represented in message display 216 may be organized into threads (not shown). Threads allow topical content to be nested under particular messages, thereby abstracting details associated with a nested thread from the rest of the messages contained in message display 216. This has a further benefit of maintaining an uncluttered organizational structure within message display 216. Messages associated with a particular thread may be displayed directly in message display 216 or in the area in which participant list 228 is depicted in FIG. 2A. Unlike new messages posted to a group-based communication system channel, new messages posted in-thread typically only result in notifications to users who have subscribed to notifications in the thread and users who are explicitly mentioned within the thread. In some embodiments, a synchronous multimedia collaboration session may be initiated from within a thread so that only those users who would receive notification based on a new message in the thread will receive an invitation to participate in the synchronous multimedia collaboration session. In some embodiments, real-time notifications are sent to users to join a synchronous multimedia collaboration session when people and/or channels relevant to the users are participating in a synchronous multimedia collaboration session associated with a channel frequented by the users. For example, a real-time notification could be sent with a reference to "Bob, Allen, and AJ are talking about 'Q4 Late-breaking Wins' in a channel entitled #sales."

In some embodiments, users who are not members of the channel but are viewing the channel and/or a particular thread may join an active synchronous multimedia collaboration session, if such a synchronous multimedia collaboration session has been initiated and is associated with the channel and/or thread.

In addition to threads, many other entry points for initiating synchronous multimedia collaboration sessions may be provided. In some embodiments, a workflow (e.g., an automated sequence of steps that may include starting a synchronous multimedia collaboration session that is triggered by an event) is provided in connection with a group-based communication system, and successful execution of certain workflow steps may cause the initiation of a synchronous multimedia collaboration session based on parameters received or calculated in connection with execution of the corresponding workflow. Similarly, an application programming interface to the group-based communication system may be provided to permit third-party applications and integrations to initiate a synchronous multimedia collaboration session in connection with the group-based communication system. In some such embodiments, the application programming interface may be implemented as a RESTful web application programming interface.

In some embodiments, when a document is posted to a group-based communication system, for example either into a channel or directly into a thread associated with a particular group-based communication system message, the document itself may serve as an entry point to a synchronous multimedia collaboration session. In such an embodiment, content of the document, including metadata designating authors or contributors to the document may be used to provide a list of initial invitees to the synchronous multimedia collaboration session. In some other embodiments, specific contents of the posted document may provide information regarding a synchronous multimedia collaboration session to be established, such as providing a name and/or topic for the synchronous multimedia collaboration session.

In some embodiments, a synchronous multimedia collaboration session regarding a posted document may be initiated with a name of the synchronous multimedia collaboration session corresponding to the name of the posted document. In these embodiments, a synchronous multimedia collaboration session may be initiated by selecting an associated document and activating an associated user interface affordance operable to join the user to a synchronous multimedia collaboration session. Alternatively, opening a document that is associated with a synchronous multimedia collaboration session will cause a user interface affordance associated with the synchronous multimedia collaboration session to be added to a toolbar associated with the document such that a synchronous multimedia collaboration session associated with the document can be joined by the user from within the user interface being used to work on the document. In addition to starting a synchronous multimedia collaboration session from a group-based communication system message, thread, or document, in some embodiments, a synchronous multimedia collaboration session may be initiated from any object within the group-based communication system, basing the corresponding newly initiated synchronous multimedia collaboration session on content associated with the object. Such objects from which a synchronous multimedia collaboration session may be initiated include group-based communication channels, messages, users, workspaces, and direct messages.

In FIG. 2A, an exemplary synchronous multimedia collaboration session has been initiated from channel #projspaceship. When a synchronous multimedia collaboration session has been initiated, user interface 200 may selectively display a sidebar pane responsive to user actuation of controls 214. As depicted, synchronous multimedia collaboration session pane 220 is depicted a user has selected the "synchronous multimedia collaboration session" control 214 to initiate a synchronous multimedia collaboration session. Controls 214 may include useful information that may be updated in real time. For example, as depicted, "synchronous multimedia collaboration session" control 214 shows a "6," indicating that six users are currently participating in the synchronous multimedia collaboration session. Similarly, the "add user" control might show a current number of users in the channel. The icon itself might also change to reflect a type of multimedia. For example, if the multimedia type for the synchronous multimedia collaboration session changes from audio-only to audio/video, the headphones icon might change to a camera icon. Similarly, a projector screen icon might be shown for a screen share session, or a file icon might be shown for a file sharing session. Synchronous multimedia collaboration session pane 220 includes a synchronous multimedia collaboration session control header 222 with controls for controlling the synchronous multimedia collaboration session. For example, as depicted, synchronous multimedia collaboration session control header 222 includes a multimedia type control 224 and a start synchronous multimedia collaboration session control 226. In some embodiments, the multimedia type control 224 allows users to select or change a particular type of multimedia collaboration. For example, a user might be able to select from audio-only, audio/video, screen share, scratch pad/whiteboard, file share, or any other type of a synchronous multimedia collaboration session. In some embodiments, a "talking heads" synchronous multimedia collaboration session is available including audio and a small, headshot-only video, image, or animation for the speaker. Non-speaking users may be represented with just the user's profile icon.

In some embodiments, synchronous multimedia collaboration session control header 222 may provide information such as a subject and/or a topic in addition to a number of members, for example. In some such embodiments, the topic can be pulled from an associated thread or channel and automatically and auto populated.

In some embodiments, once a synchronous multimedia collaboration session has started, a user can use multimedia type control 224 to change to a different type of synchronous multimedia collaboration session without interrupting the ongoing synchronous multimedia collaboration session. For example, a user may upgrade the synchronous multimedia collaboration session from audio-only to audio/video (or audio/screen share) or downgrade the synchronous multimedia collaboration session from audio/video to audio-only. In other embodiments, users can only upgrade ongoing synchronous multimedia collaboration sessions to add additional media stream types. In some embodiments, a recording control may further be provided for the entire synchronous multimedia collaboration session or an individual media stream of the multimedia stream to toggle recording of a portion or all of the synchronous multimedia collaboration session. In some embodiments, a size associated with a corresponding multimedia video stream will modulate its size within a corresponding user interface control according to an activity level within the synchronous multimedia collaboration session. In these embodiments, a streaming video window may shrink and fade into a minor region within the user interface control when a particular synchronous multimedia collaboration session is in active and will grow to use a substantial portion of the user interface control during times of substantial activity within the synchronous multimedia collaboration session.

In some embodiments, start synchronous multimedia collaboration session control 226 allows any user to start a synchronous multimedia collaboration session if a synchronous multimedia collaboration session is not already in progress. In other embodiments, only selected users (for example, managers or channel administrators) can start synchronous multimedia collaboration sessions. In some embodiments, only channel members with appropriate permissions may start a synchronous multimedia collaboration session. In some embodiments, only members of the channel or members of a first organization of a multi-organization channel can start a synchronous multimedia collaboration session. In some embodiments, anyone in the organization, workspace, or channel can join the synchronous multimedia collaboration session. In some embodiments, only channel members of a first organization can join the synchronous multimedia collaboration session. In some embodiments, non-channel members who have appropriate permissions (e.g., same org, same workspace) may join the synchronous multimedia collaboration session. In some embodiments, start synchronous multimedia collaboration session control 226 ends a synchronous multimedia collaboration session if it is actuated during an ongoing synchronous multimedia collaboration session. For example, if a user in a synchronous multimedia collaboration session actuates the control, the session may be terminated, or the user might leave the synchronous multimedia collaboration session without terminating the synchronous multimedia collaboration session for the other participants. In some embodiments, if there is an ongoing synchronous multimedia collaboration session which the user has not joined, start synchronous multimedia collaboration session control 226 may add the user to that synchronous multimedia collaboration session upon actuation. In some embodiments, start synchronous multimedia collaboration session control 226 changes appearance based on whether there is an ongoing synchronous multimedia collaboration session and whether the user is currently joined to that session. The user may join or leave the synchronous multimedia collaboration session as many times as the user wants as long as the synchronous multimedia collaboration session is ongoing. If the user is the owner of the synchronous multimedia collaboration session and leaves, the owner of the synchronous multimedia collaboration session is transferred to another user. In some embodiments, the synchronous multimedia collaboration session remains active as long as there is one or more users who have joined the synchronous multimedia collaboration session.

In some embodiments, a synchronous multimedia collaboration session is tied to a channel such that any active user who is currently viewing the channel is joined to the synchronous multimedia collaboration session. For example, if a user in a particular channel starts a synchronous multimedia collaboration session, all users currently viewing the channel may be added to the synchronous multimedia collaboration session. In some embodiments, they are added to the synchronous multimedia collaboration session in receive-only mode (for example, muted and with the camera off) to preserve privacy. In some embodiments, users viewing a particular thread in the channel are added to the synchronous multimedia collaboration session.

In some embodiments, users may be able to pre-configure auto-join preferences determining whether (and in what capacity) they are automatically joined to synchronous multimedia collaboration sessions on entering a channel or on session initiation. For example, a first user might specify that they wish to automatically join all synchronous multimedia collaboration sessions, a second user might specify that they wish to join newly created synchronous multimedia collaboration sessions in receive-only mode, a third user might specify that they never wish to automatically join synchronous multimedia collaboration sessions, and a fourth user might specify that they wish to join newly-created synchronous multimedia collaboration sessions in receive-only mode and join synchronous multimedia collaboration sessions in send/receive mode upon channel switching only if they were in a synchronous multimedia collaboration session in the previous channel prior to switching. In some embodiments, the permissions for users determine how they join and set up synchronous multimedia collaboration sessions. In some embodiments, the permissions are set up by an administrator of the organization. A person of ordinary skill in the art, upon reviewing this disclosure, will appreciate that many other configurations for automatically joining synchronous multimedia collaboration sessions are possible as well, and all such configurations are contemplated as being within the scope of the invention.

If a participating user leaves the first channel (for example, by selecting a second channel in channel list 208), they may be disconnected from the synchronous multimedia collaboration session associated with the first channel and joined to any ongoing synchronous multimedia collaboration session in the second channel. Similarly, if a user begins viewing a channel (by selecting that channel or logging on to the group-based communication system) the user may be automatically joined to an in-progress synchronous multimedia collaboration session if one exists. In some embodiments, only one synchronous multimedia collaboration session may be enabled for a channel at one time. In some embodiments, multiple synchronous multimedia collaboration sessions may be simultaneously live in a channel. In some embodiments, a user may switch between multiple synchronous multimedia collaboration sessions without being disconnected from any of the joined synchronous multimedia collaboration sessions.

In some embodiments, synchronous multimedia collaboration session pane 220 further displays participant list 228. Participant list 228 may display the members of the channel and their current participation status. For example, when no synchronous multimedia collaboration session is in progress, one or more status icons 230 may be displayed for each user indicating presence (for example, whether the user is active, idle, logged off, or busy). When a synchronous multimedia collaboration session is in progress, participant list 228 may be subdivided into joined users in participant list 228 and un-joined users 232. For the joined users in a synchronous multimedia collaboration session, status icons 230 may be changed to indicate the capacity (e.g., muted, video on/off) in which the associated user has joined the synchronous multimedia collaboration session. In some embodiments, a summary indicating the number of joined users may be displayed in the synchronous multimedia collaboration session pane. In some embodiments, the synchronous multimedia collaboration session pane may further display a topic for the synchronous multimedia collaboration session. In some embodiments, a host may dynamically update this topic. In some other embodiments, status icons 230 may include a separate audio volume control so that users can adjust the volume up or down depending on how the user is participating in the synchronous multimedia collaboration session. Such a separate volume control has the benefit of encouraging passive listening by users who may not need to actively participate but who may become aware, by virtue of their passive listening, of a topic which subsequently arises that the user does in fact wish to actively contribute.

For example, user interface 200 depicts an ongoing audio-only collaboration session. In some embodiments, information may be shown in synchronous multimedia collaboration session pane 220 summarizing the participants in the synchronous multimedia collaboration session. For example, as depicted, the headphones icon shows that six channel members are currently participating in the synchronous multimedia collaboration session. This information may be updated in real time. As depicted, some users have joined the audio-only synchronous multimedia collaboration session in send-receive mode (as indicated by the headphones and microphone icon), some users have joined the audio-only synchronous multimedia collaboration session in send-receive mode but are muted (as indicated by the headphones and the struck-through microphone) and some users have joined the audio-only synchronous multimedia collaboration session in receive-only mode as indicated by the "headphones" icon with no microphone icon. Additional icons may indicate who is currently speaking (as depicted, the speaker icon). A person of skill in the art, reviewing this disclosure, will appreciate that other icons can be used for other types of synchronous multimedia collaboration session and participation (for example, a camera icon for users participating in a video-present synchronous multimedia collaboration session or a display icon for users in a screen-sharing synchronous multimedia collaboration session). A person of ordinary skill in the art will further appreciate that these icons can be combined to represent the various media streams in a synchronous multimedia collaboration session. For example, one user might be sharing video while other users collaborate on a whiteboard and a third user speaks. Non-joined users may display an icon indicating a reason why they are not joined (for example, if they are away from their computer or busy in a meeting). In some embodiments, a nudge control (not displayed) may be present for non-joined users to allow a joined user to request that the non-joined user join the synchronous multimedia collaboration session. In some embodiments, in response to a joined user activating the nudge control, the nudged user may be joined to the synchronous multimedia collaboration session without the non-joined user having to take action to join the synchronous multimedia collaboration session. In some embodiments, upon receiving a nudge to join a synchronous multimedia collaboration session, a user may decline to join the synchronous multimedia collaboration session. In some embodiments, users are provided with a simple activate button to respond with a rejection of a joining invitation. In some mobile-device embodiments, such a suggestion may be provided in the form of a button or a gesture such as swiping away the nudge. In some embodiments, the non-joined user may receive a notification notifying the non-joined user that they have been invited to join the synchronous multimedia collaboration session. In some embodiments, the notification may include a button to join the non-joined user to join or decline the synchronous multimedia collaboration session. In some other embodiments, a host of the synchronous multimedia collaboration session may issue a nudge to one or more (or all) of the members of a particular group-based communication system channel, such a multi-user nudge has the benefit of making a corresponding user experience convenient for the host of a synchronous multimedia collaboration session to nudge all (or a portion of) the channel members.

In some embodiments, users may react to the speaker by selecting an emoji to react to the speaker in real time. Using visual reactions such as emojis may facilitate audience feedback without interrupting speakers. Using visual reactions has the further benefit of permitting a vastly larger number of muted participants to participate in a synchronous multimedia collaboration session, providing input without disruptions associated with audio crosstalk. In some embodiments, the selected emojis are displayed next to the speaker's icon. In some embodiments, the selected emoji is displayed next to the user's icon. In some embodiments, the emoji may be displayed ephemerally in a user interface in synchronous multimedia collaboration session pane 220 associated with the collaboration and disappear after a predetermined period of time. In some embodiments, a set of representative reaction emoji and a count associated with each reaction emoji is displayed in the user interface associated with the collaboration instead or in addition. In some embodiments, in order to increase a viable number of participants in a particular synchronous multimedia collaboration session, a moderator is provided to mute and unmute audio participants, for example. In some cases, it is desirable to have fewer than fifteen unmuted speakers at a particular time. In some other cases, it is preferable to have only five unmuted speakers, and in some cases, it is best to have a single unmuted speaker at any given time. By bringing in a moderator, it is possible to have hundreds of participants, any of which may be promoted to an unmuted speaker when deemed appropriate by a moderator. In some embodiments, a human moderator is provided. In some other embodiments, an artificial intelligence moderator is provided that employs machine learning models to identify candidates to be unmuted and permitted to speak based on, for example, logs regarding how prior human moderators have moderated access.

Figure 2B:
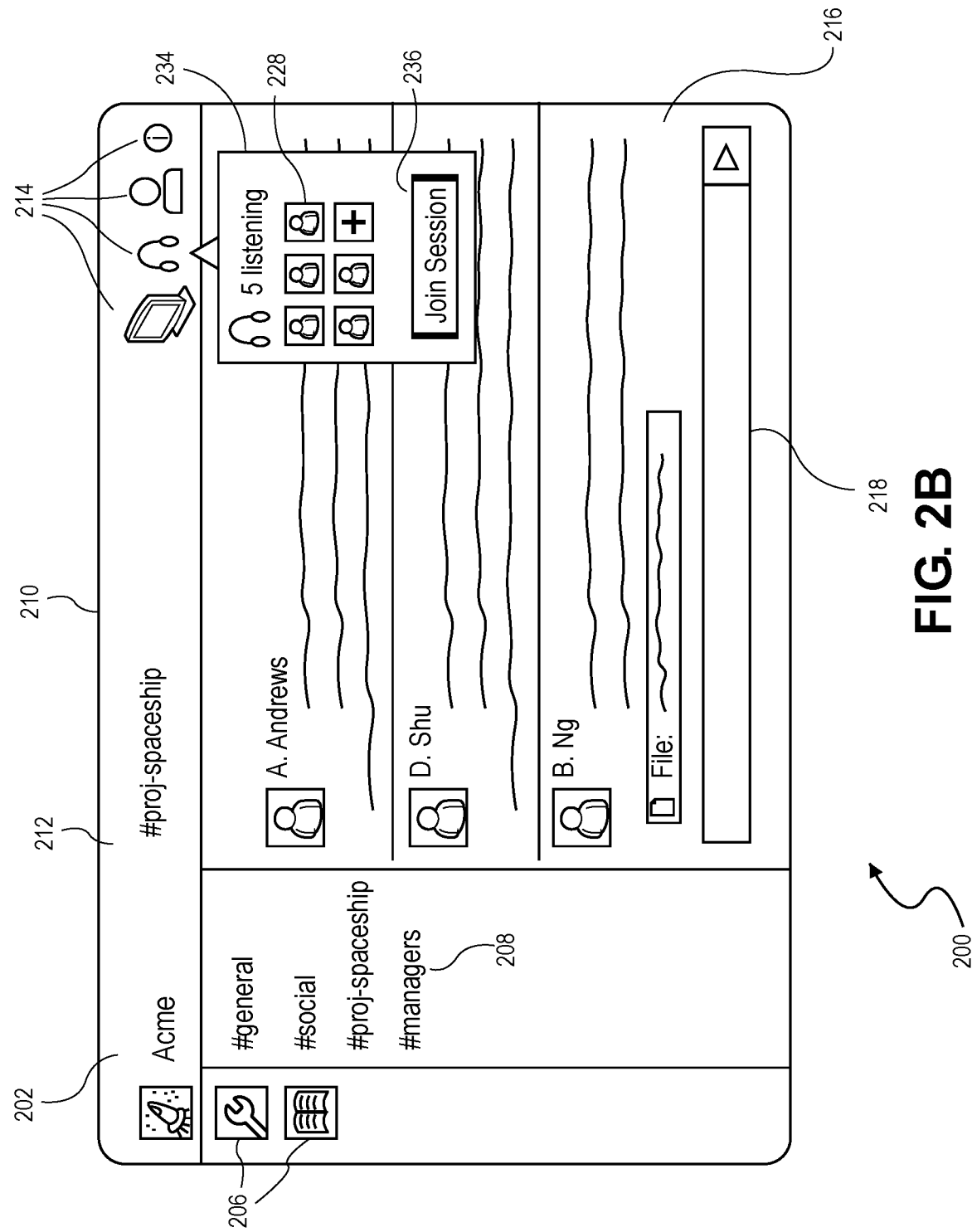
FIG. 2B depicts a user interface depicting a second use case of one embodiment of the invention.

In connection with FIG. 2B, a second view of user interface 200 depicting a second case of one embodiment of the invention is depicted. Where common features or elements are unchanged, they are not discussed separately from their description with respect to FIG. 2A. In FIG. 2B, synchronous multimedia collaboration session pane 220 has been popped out into synchronous multimedia collaboration session window 234. In some embodiments, synchronous multimedia collaboration session window 234 can be re-docked as synchronous multimedia collaboration session pane 220 anywhere in user interface 200. For example, synchronous multimedia collaboration session window 234 can be re-docked as synchronous multimedia collaboration session pane 220 on the right side of the user interface (as shown in FIG. 2A) or left of navigation pane 202. Alternatively, synchronous multimedia collaboration session window 234 can remain as a separate undocked window and positioned anywhere in user interface 200. In some embodiments, multimedia collaboration window 234 appears when the user hovers over (or clicks on) the "synchronous multimedia collaboration session" control 214 when the synchronous multimedia collaboration session pane 220 is not displayed.

As shown, synchronous multimedia collaboration session window 234 depicts a collapsed view of the synchronous multimedia collaboration session, showing only user icons for the joined users, a "join synchronous multimedia collaboration session" button 236 and summary information for the synchronous multimedia collaboration session (for example, an icon representing the multimedia type). In other embodiments, more or less information may be shown in synchronous multimedia collaboration session window 234, or synchronous multimedia collaboration session window 234 may show the same information as synchronous multimedia collaboration session pane 220. In some embodiments, synchronous multimedia collaboration session information may be shown in navigation pane 202 instead or in addition. For example, a section may be added below channel list 208 showing synchronous multimedia collaboration session information for the user, including the user's active synchronous multimedia collaboration session, any un-joined synchronous multimedia collaboration sessions in channels to which the user belongs, and any nudge notifications that the user has been invited to join a synchronous multimedia collaboration session. In some embodiments, this synchronous multimedia collaboration session section in the navigation pane may be collapsed when not in use.

Figure 3:
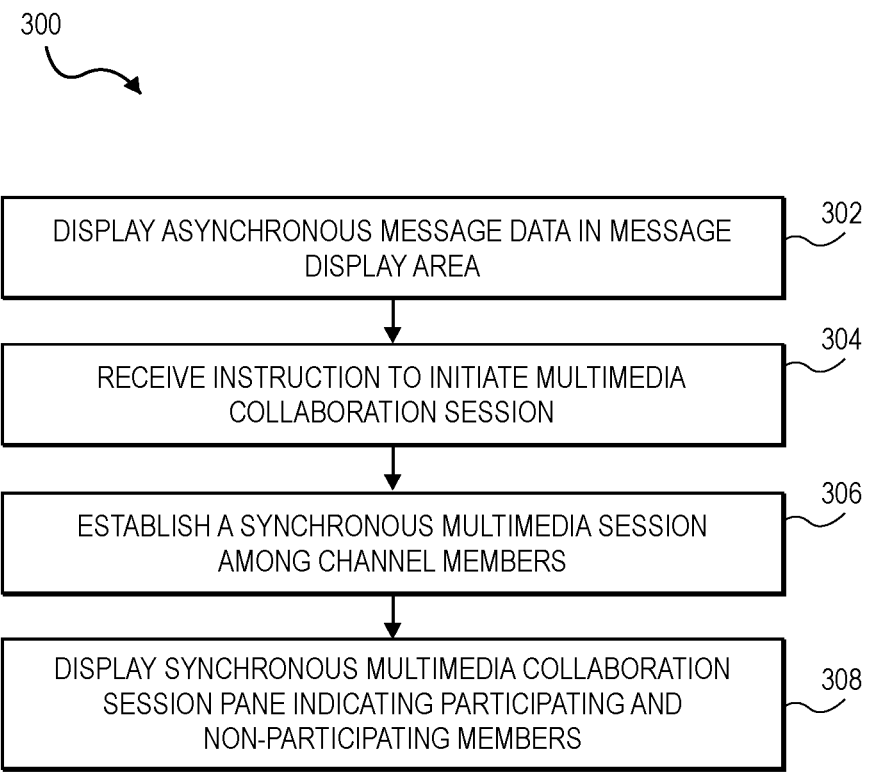
FIG. 3 depicts a flowchart illustrating the operation of a method in accordance with embodiments of the invention.

FIG. 3 depicts a flowchart illustrating the operation of a method 300 in accordance with embodiments of the invention. Initially, at step 302, asynchronous message data is displayed in a message display area of the user interface of a group-based communication system. As used herein, "asynchronous message data" includes data (such as textual content, files, images, or replies/reaction data) that is posted by one user and can be viewed by one or more other users an arbitrary amount of time later. In some embodiments, the message display area is a channel-specific message display area for messages posted in a particular channel of the group-based communication system. In some such embodiments, only members of the channel can post in the channel and/or view messages posted in the channel.

Next, at step 304, an instruction is received, from a user and via the user interface, to initiate a synchronous multimedia collaboration session. For example, the user may select control 226 in synchronous multimedia collaboration session pane 220 to initiate the synchronous multimedia collaboration session. In some embodiments, any user of the group-based communication can initiate a synchronous multimedia collaboration session. In other embodiments, only specific users or users with a particular permissions level can initiate a synchronous multimedia collaboration session. In still other embodiments, only users who are members of a channel can initiate a synchronous multimedia collaboration session in that channel. In some embodiments, a user may indicate a type of multimedia for the synchronous multimedia collaboration session. For example, the user may select audio-only or audio-video. In some embodiments, the synchronous multimedia collaboration session is initiated immediately. In other embodiments, the user may additionally specify a delayed start for the synchronous multimedia collaboration session. For example, the user might indicate that the synchronous multimedia collaboration session should start in one minute, two minutes, three minutes, or five minutes to allow other participants a chance to prepare.

Processing then proceeds (after the specified delay interval, if indicated) to step 306. At step 306, the group-based communication system establishes a synchronous multimedia collaboration session among the channel members. As used herein, the term "synchronous multimedia" refers to the real-time or substantially real-time exchange of multimedia content among the synchronous multimedia collaboration session participants. Examples of synchronous multimedia include voice and video calls, streaming screen sharing, and collaborative whiteboarding or scratch padding. In contrast, examples of asynchronous multimedia include previously recorded content such as recorded video or podcasts that users may access at any point in time after the content has been recorded or posted. In some embodiments, all active (or all users regardless of active status) members of the channel members are added to the synchronous multimedia collaboration session. In some such embodiments, channel members are added in receive-only mode. In other embodiments, each channel member is added, not added, or added in receive-only mode based on a preconfigured preference of the user. In still other embodiments, users are prompted for a join mode when the synchronous multimedia collaboration session is established and can choose to receive only or send and receive for each media type in the synchronous multimedia collaboration session. Some screen sharing use case scenarios include "coworking" scenarios in which multiple users work together on a collaborative work product. Coworking scenarios enable simultaneous screen sharing interfaces in which multiple users each have a live cursor interacting with a shared application. Such specific use cases include: (i) pair or team programming where two or more users work simultaneously on source code in a source code editor; (ii) two or more users working on (or review) the same spreadsheet at the same time; (iii) two or more users jointly work on a presentation at the same time; and (iv) multiple users iterating on a design document at the same time. In order to establish a coworking session between two or more coworking users, at least one of the coworking users may select one or more of a plurality of collaboration components as presented in connection with a display associated with a group-based communication system interface. In some embodiments, the group-based communication system interface performs a method including several steps. A first step involves detecting selection of a collaboration component of the plurality of collaboration components. In response to detecting selection of the collaboration component, subsequent steps are performed. Such steps include rendering on a display of the group-based communication system client, an interactive collaboration user interface associated with the collaboration component in a collaboration pane. A collaboration pane is a portion of the display area in which the coworking is carried out, i.e., where separate live cursors designate portions of a shared user interface being worked on by the two or more coworking users. The interactive collaboration user interface is then engageable by one or more participants of the plurality of participants.

In addition to users automatically joined to the synchronous multimedia collaboration session (or who choose to join the synchronous multimedia collaboration session when prompted upon creation), users may join (or leave) the synchronous multimedia collaboration session at any point during the synchronous multimedia collaboration session. In particular, in some embodiments, users may automatically be joined to (or be automatically prompted to join) the synchronous multimedia collaboration session when they select the associated channel for viewing in the group-based communication system. Similarly, in some embodiments, users may automatically be removed from the synchronous multimedia collaboration session (or be prompted to leave) upon viewing a different channel in the group-based communication system. In this way, the synchronous multimedia collaboration session provides ad hoc, ambient audio (or other multimedia content, such as a shared whiteboard) to the channel, enhancing spontaneous collaboration between channel members.

Additionally, at step 308, a synchronous multimedia collaboration session pane is displayed in the user interface. This pane may be displayed before step 302, after step 306, or at any other point in the process. The synchronous multimedia collaboration session pane displays identifiers for a plurality of participating and non-participating users (for example, the participating and non-participating channel members). In some embodiments, the participating users are displayed so as to indicate whether each user is participating or non-participating. For example, participating users and non-participating users may be displayed separately. In some embodiments, participating users are shown in a first section and non-participating users are shown in a separate section. In some embodiments, users are displayed with one or more status icons to indicate a capacity in which each user had joined the synchronous multimedia collaboration session. In some embodiments, the synchronous multimedia collaboration session pane is updated in real time to reflect the state of the synchronous multimedia collaboration session as users join, leave, and switch between multimedia modes.

Figure 4:
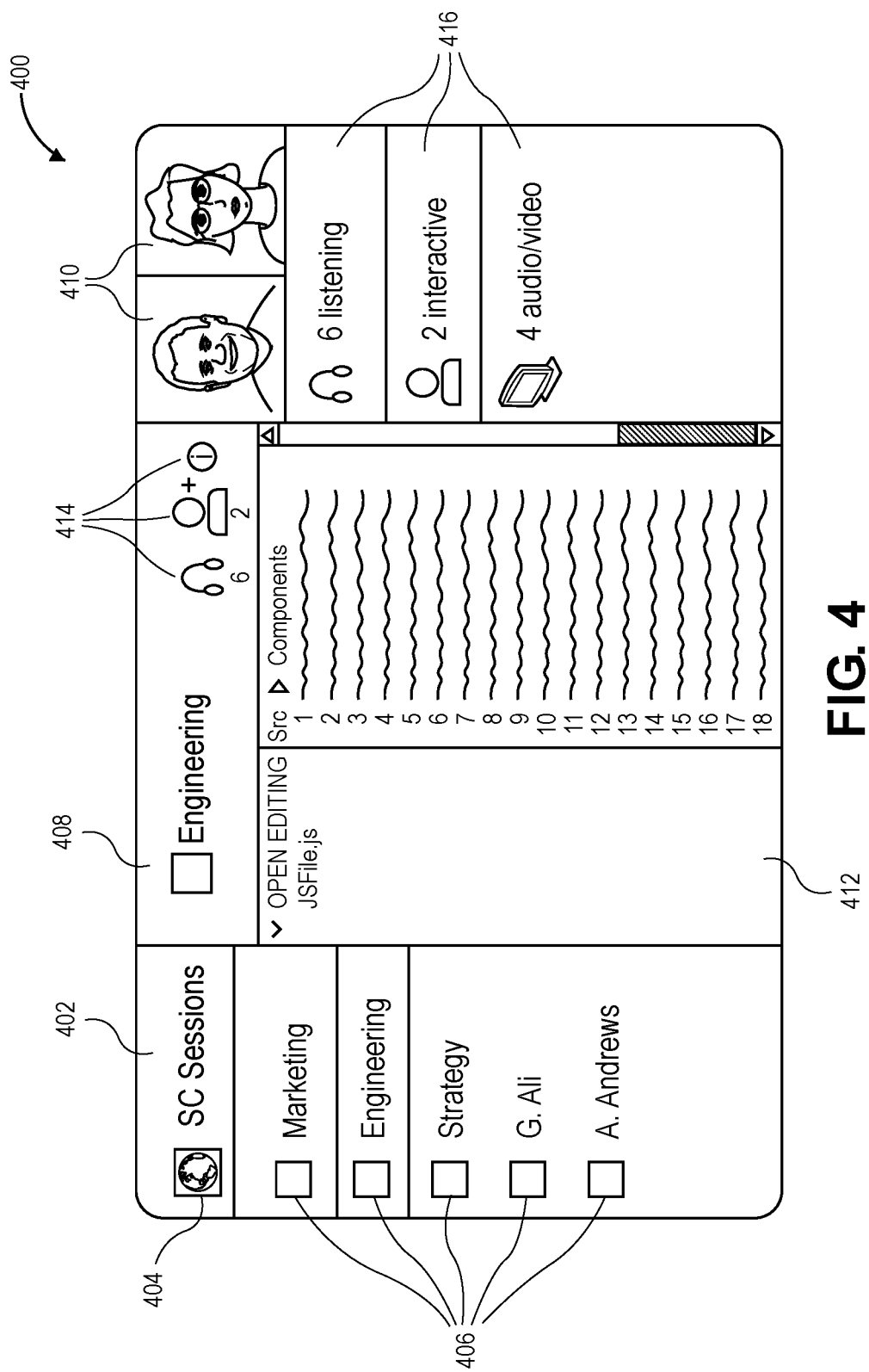
FIG. 4 depicts an exemplary user interface for facilitating discovery of synchronous multimedia collaboration opportunities in one embodiment of the invention.

FIG. 4 depicts a user interface 400 for facilitating discovery of synchronous collaboration opportunities. User interface 400 depicts a number of synchronous multimedia collaboration sessions that are available within a group-based communication system for collaboration between a group of users who may be internal or external to a particular group-based communication system. Users of the group-based communication system may join (or request to join) one or more of the depicted synchronous multimedia collaboration sessions. Accordingly, embodiments of the invention allow users to collaborate ambiently, as if they were working together in the same room, but without the need for physical proximity. Integrating such ambient collaboration into the group-based communication system has benefits of reducing barriers to collaboration either internally or externally to a particular organization or set of organizations.

As depicted, user interface 400 includes a session navigation pane 402 for navigating within the available synchronous multimedia collaboration sessions. For example, navigation pane 402 may include a session label pane 404 with one or more session labels to allow the user to switch between different synchronous multimedia collaboration sessions using a user interface control associated with user interface 400. As depicted, a user may select among a number of various synchronous multimedia collaboration sessions 406. In some embodiments, the list of proposed synchronous multimedia collaboration sessions 406 is prioritized based on a user's activity within the group-based communication system. For example, metadata within the group-based communication system may be employed to derive a list of other users within the group-based communication system with which a particular user has interacted in the past. Accordingly, collaboration sessions having users with which a particular user has exchanged messages in the past may be prioritized in the session list presented in user interface 400.

In some embodiments, synchronous multimedia collaboration sessions 406 are function based, for example relating to a marketing function within an organization. Other functional examples for synchronous multimedia collaboration sessions include engineering, and strategy. In these embodiments, ad hoc synchronous multimedia collaboration sessions may be initiated by individual users under their own name or given an arbitrary designation. Synchronous multimedia collaboration sessions may be person-based, meaning that a particular user signals his or her availability to collaborate in the fashion of open-door office hours. In some embodiments, the user who initiates a person-based synchronous multimedia collaboration session may specify a set of groups or users who may join the synchronous multimedia collaboration session. In these embodiments, the synchronous multimedia collaboration session will be only visible to those users who have been granted permission to join the synchronous multimedia collaboration session. For example, an executive assistant may initiate a synchronous multimedia collaboration session from within an executive staff channel which will invite all executive staff members to a synchronous multimedia collaboration session while also limiting participation to the members of the executive staff of a particular organization. In addition to specifying which users may join, sessions may be scheduled in advance, in connection with a calendaring system, for example, so that sessions may occur on a regular or irregular schedule. In some embodiments, each of the synchronous multimedia collaboration sessions are ephemeral in that they are displayed and removed from display depending on availability of the collaboration session and/or whether a particular viewing user has permissions to join a particular synchronous multimedia collaboration session.

In some embodiments a member of a multi-user direct messaging group may choose to initiate a synchronous multimedia collaboration session based on the multi-user direct messaging group. In some such embodiments, a user providing input such as a right click, a long press, or other corresponding mobile gesture may provide an option for the user to convert a multi-user direct messaging group into a corresponding synchronous multimedia collaboration session to which the members of the direct messaging group will be invited or be otherwise limited to those members as participants.

As depicted, user interface 400 includes shared application display 412. In some embodiments, shared application display 412 showcases a shared application used in connection with a synchronous multimedia collaboration session in embodiments of the invention. As depicted, a plurality of users may collaborate using a source code editor either to develop or troubleshoot source code. Alternatively, such a synchronous multimedia collaboration session could be used in connection with a source code review session in which an author of a particular piece of source code could present his or her implementation to a group of users who could ask questions or provide critique. Within the shared application, multiple cursors associated with each participating interactive user may be provided, enabling multiple users to edit and annotate the source code simultaneously. In some other embodiments, a single user may interact with the source code editor at any given point in time. Other types of application, such as a document editor, web browser, spreadsheet, presentation software, game, photo or video editing software, command line terminal, or file browser are also contemplated. In some embodiments, multiple users may jointly review a spreadsheet to refine a sales forecast, for example. In some other embodiments, multiple users may iterate through features in a design document, refining aspects of a particular design.

User interface 400 may include session header 408, which displays metadata for the currently selected synchronous multimedia collaboration session, including session name and other session contents. Session header 408 may also include controls 414 for starting a synchronous multimedia collaboration session, adding new members to the synchronous multimedia collaboration session, displaying additional information about the synchronous multimedia collaboration session, administering the synchronous multimedia collaboration session, or other functions such as initiating application sharing or whiteboard collaboration (as further described in connection with FIG. 5 below). In some embodiments, controls 414 for starting the synchronous multimedia collaboration session may be located elsewhere in navigation pane 402 or from other parts of user interface 400. In some embodiments, controls 414 further select a sidebar pane as discussed in further detail below. In some embodiments, the controls display additional information when the user hovers over them.

User interface 400 may also selectively display a sidebar pane responsive to user actuation of controls 414. As depicted, a synchronous multimedia collaboration session pane displays interactive participant video windows 410 containing streaming webcam views of participants in the collaboration sessions. As described above, a size associated with a corresponding webcam video stream may, in some embodiments, modulate its size within a corresponding user interface control according to an activity level within the webcam stream. In these embodiments, a streaming video window may shrink and fade into a minor region within the user interface control when a particular session is inactive and grow to use a substantial portion of the user interface control during times of substantial activity within the synchronous multimedia collaboration session. In some embodiments, a "talking heads" synchronous multimedia collaboration session is available including audio and a small, headshot-only video, image, or animation for the speaker. Non-speaking users may be represented with just the user's profile icon. In some embodiments, once a synchronous multimedia collaboration session has started, a user can use "multimedia type" control to change to a different type of multimedia session without interrupting the ongoing synchronous multimedia collaboration session. For example, a user may upgrade the synchronous multimedia collaboration session from audio-only to audio/video (or audio/screen share) or downgrade the synchronous multimedia collaboration session from audio/video to audio-only. In other embodiments, users can only upgrade ongoing synchronous multimedia collaboration sessions to add additional media stream types. In some embodiments, a recording control may further be provided for the entire synchronous multimedia collaboration session or an individual media stream of the multimedia stream to toggle recording of a portion or all of the synchronous multimedia collaboration session. In some embodiments, a particular user of the group-based communication system may elect to subscribe to an advance-published set of planned synchronous multimedia collaboration sessions or synchronous multimedia collaboration sessions that have occurred in the past and been recorded. In these embodiments, a user effectively "pulls" content as opposed to having content "pushed" to a user as in the scenario of being invited in real time to a synchronous multimedia collaboration session. A benefit of subscribing to meetings or accessing pre-recorded synchronous multimedia collaboration content is that a user may schedule a convenient time for the user to consume the associated information, the user may fast forward and/or rewind and listen to and/or view the recorded content at a higher (or lower) speed playback, for example. In some embodiments, such a content "pull" interface would have the benefits of allowing a user to pull from a predefined queue of recorded synchronous multimedia collaboration sessions, accessing them in a manner that is analogous to one or more podcasts.

In some embodiments, a size associated with a corresponding multimedia video stream will modulate its size within a corresponding user interface control according to an activity level within the collaboration session. In these embodiments, a streaming video window may shrink and fade into a minor region within the user interface control when a particular synchronous multimedia collaboration session is inactive and will grow to use a substantial portion of the user interface control during times of substantial activity within the synchronous multimedia collaboration session. In some embodiments, for use in noisy environments or where it would not be convenient to use a speaker or headset, real-time closed captioning corresponding to speech occurring during the session is provided in connection with the streamed and recorded video. Such real-time closed captioning may also be captured to provide transcripts of streaming sessions as well as to facilitate accessibility. Any such recordings or transcripts may be scheduled for preservation or destruction with a corresponding preconfigured session preservation profile. In order to provide privacy and security, enterprise key management functionality and geographical data residency principles may be provided for regulatory compliance purposes and to ensure privacy. These principles are described in additional detail in U.S. patent application Ser. No. 17/018,165, U.S. patent application Ser. No. 16/989,452, and U.S. patent application Ser. No. 16/918,284, the contents of which are hereby incorporated by reference.

In some embodiments, status indicators 416 indicate how each of the active participants are currently participating, whether for example, by listening, interactively participating in use of the shared application, or by sharing an audio/video stream. Users may join or leave synchronous multimedia collaboration sessions as frequently as desired as long as the synchronous multimedia collaboration session is ongoing. In some embodiments, where a leaving user is an initiator of a particular session and switches out of that session, ownership of the session is transferred to another user. In some embodiments, the synchronous multimedia collaboration session remains ongoing as long as there is one or more users who have joined the synchronous multimedia collaboration session. In these embodiments, when a last user leaves, the synchronous multimedia collaboration session is terminated, and associated resources are freed.

Figure 5:
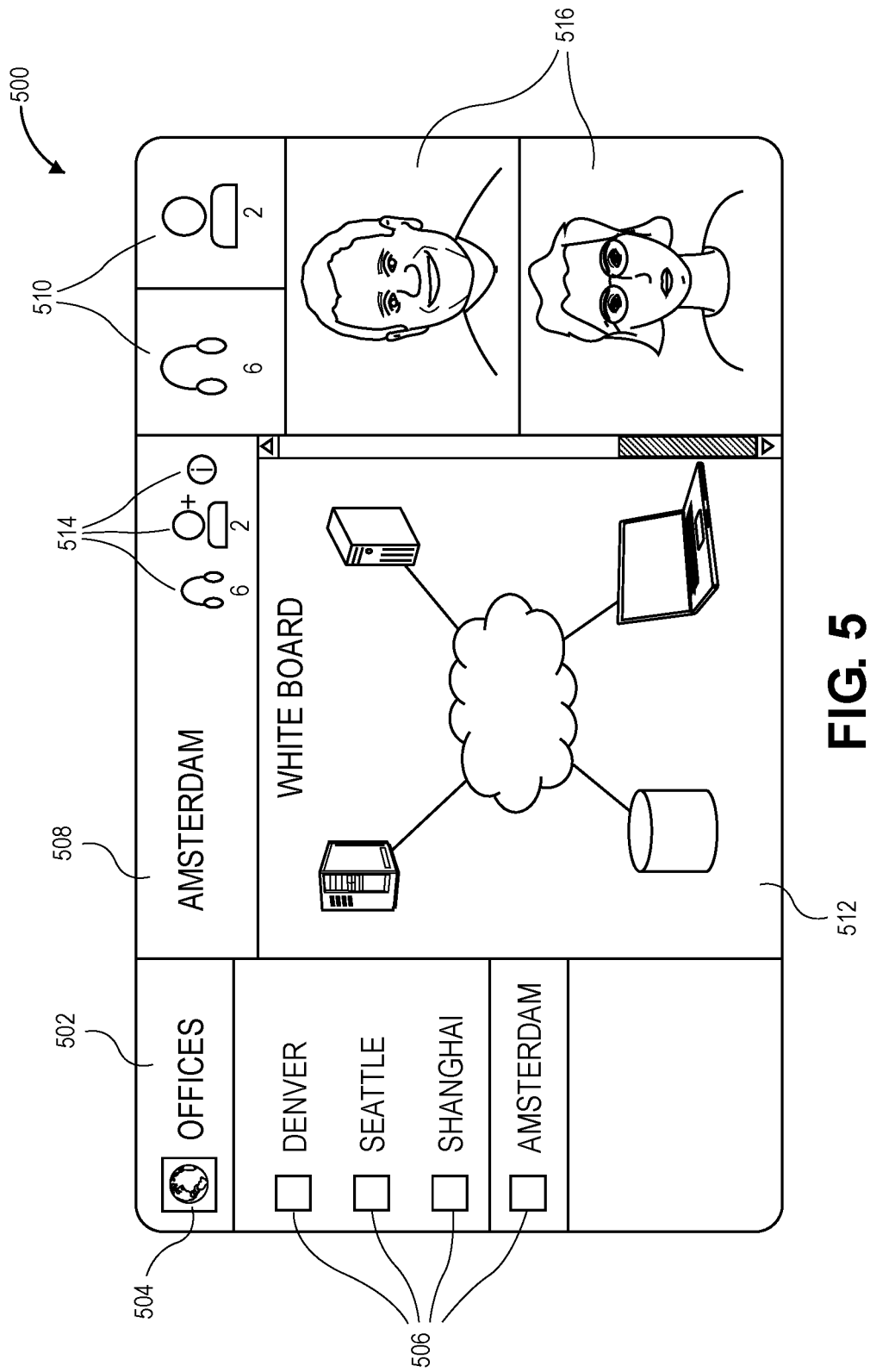
FIG. 5 depicts an exemplary user interface for facilitating discovery of synchronous multimedia collaboration opportunities in another embodiment of the invention.

FIG. 5 depicts an exemplary user interface 500 for facilitating discovery of synchronous multimedia collaboration opportunities. User interface 500 depicts a number of synchronous multimedia collaboration sessions that are available within a group-based communication system for synchronous multimedia collaboration between a group of users as described in detail above. As depicted, user interface 500 includes a session navigation pane 502 for navigating within the available synchronous multimedia collaboration sessions. As depicted, navigation pane 502 includes a session label 504 corresponding to global offices within a particular organization. As depicted, a user may select among a number of various geographical synchronous multimedia collaboration sessions 506 corresponding to the global office locations. In some embodiments, the list of proposed synchronous multimedia collaboration sessions 506 is prioritized based on a user's activity within the group-based communication system. For example, metadata within the group-based communication system may be employed to derive a list of other users within the group-based communication system with which a particular user has interacted in the past. Accordingly, synchronous multimedia collaboration sessions associated with geographies having users with which a particular user has exchanged messages in the past may be prioritized in the session list presented in user interface 500.

Next, user interface 500 includes shared whiteboard display 512. In some embodiments, shared whiteboard display 512 showcases a shared whiteboard used in connection with a synchronous multimedia collaboration session in embodiments of the invention. As depicted, a plurality of users may collaborate using a shared whiteboard application to draw and mark up diagrams to communicate and capture information. In some embodiments, each interactive user may mark up the diagrams on a corresponding whiteboard and add annotations, etc. All diagrams, drawings, artifacts, and annotations associated with the whiteboard or other shared application may be preserved in connection with an optional recording of the collaboration session for future use and reference.

User interface 500 may include session header 508, which displays metadata for the currently selected synchronous multimedia collaboration session, including synchronous multimedia collaboration session name and other contents. Session header 508 may also include controls 514 for starting a synchronous multimedia collaboration session, adding new members to the synchronous multimedia collaboration session, displaying additional information about the synchronous multimedia collaboration session, administering the synchronous multimedia collaboration session, or other synchronous multimedia collaboration session functions such as initiating application sharing or whiteboard collaboration. In some embodiments, controls 514 for starting the synchronous multimedia collaboration session may be located elsewhere in navigation pane 502 or from other parts of user interface 500. In some embodiments, controls 514 further select a sidebar pane as discussed in further detail below. In some embodiments, the controls display additional information when the user hovers over them.

User interface 500 may also selectively display a sidebar pane responsive to user actuation of controls 514. As depicted, a synchronous multimedia collaboration session pane displays interactive participant video windows 516 containing streaming webcam views of participants in the synchronous multimedia collaboration sessions. As described above, a size associated with a corresponding webcam video stream will modulate its size within a corresponding user interface control according to an activity level within the webcam stream. In these embodiments, a streaming video window may shrink and fade into a minor region within the user interface control when a particular session is inactive and will grow to use a substantial portion of the user interface control during times of substantial activity within the stream. In some embodiments, a "talking heads" multimedia session is available including audio and a small, headshot-only video, image, or animation for the speaker. Non-speaking users may be represented with just the user's profile icon. In some embodiments, once a synchronous multimedia collaboration session has started, a user can use multimedia type control to change to a different type of synchronous multimedia collaboration session without interrupting the ongoing synchronous multimedia collaboration session. In some embodiments, interactive participant video windows 516 may expand to fill an entire window (or screen) when a particular participant is actively speaking or otherwise participating in the synchronous multimedia collaboration session. In some embodiments, a sidebar thread to a synchronous multimedia collaboration session is provided so that participants may send and receive full-featured group-based communication system messages in a thread associated with the synchronous multimedia collaboration session.

In some embodiments, status indicators 510 indicate how each of the active participants are currently participating, whether for example, by listening, interactively participating in use of the shared application, or by sharing an audio/video stream. In some embodiments, background noise suppression is applied to one or more audio streams. In some embodiments, a voice is suppressed if a speaking volume is below a predetermined threshold. Users may join or leave synchronous multimedia collaboration sessions as frequently as desired as long as the synchronous multimedia collaboration session is live. In some embodiments, where a leaving user is an initiator of a particular synchronous multimedia collaboration session and switches out of that synchronous multimedia collaboration session, ownership of the synchronous multimedia collaboration session is transferred to another user. In some embodiments, the synchronous multimedia collaboration session remains ongoing as long as there is one or more users who have joined the synchronous multimedia collaboration session. In these embodiments, when a last user leaves, the synchronous multimedia collaboration session is terminated, and associated resources are freed.

Figure 6:
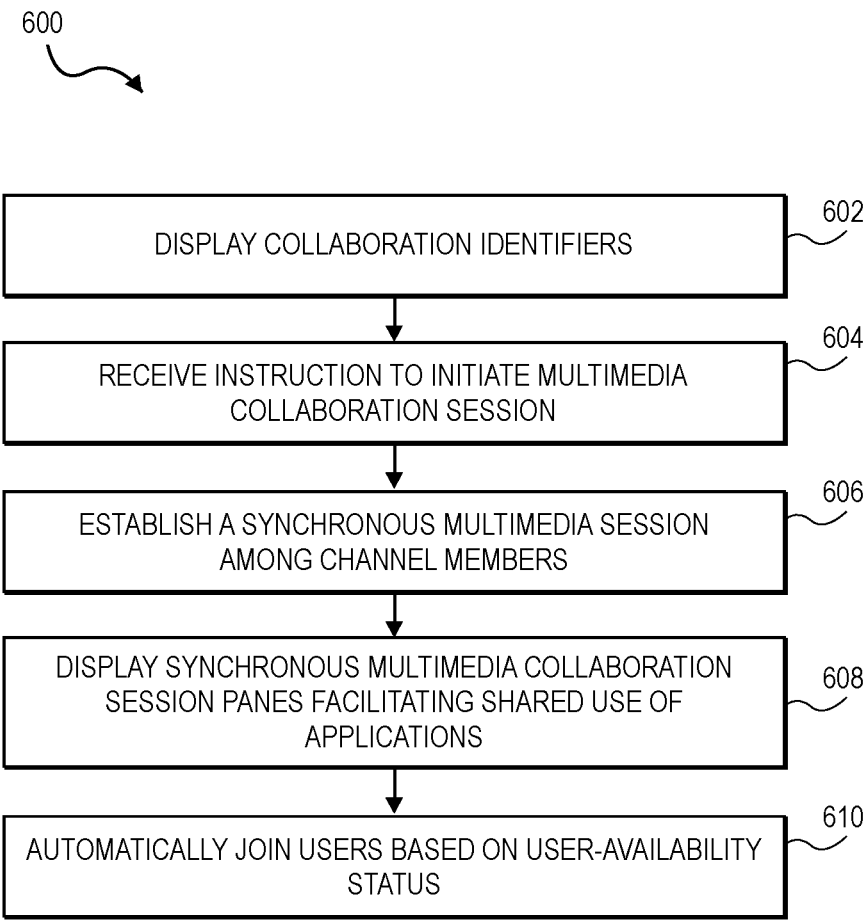
FIG. 6 depicts a flowchart illustrating the operation of a method in accordance with embodiments of the invention.

FIG. 6 depicts a flowchart illustrating the operation of a method 600 in accordance with embodiments of the invention. Initially, at step 602, one or more collaboration affordances or collaboration identifiers are displayed in a collaboration discovery display area of the user interface of a group-based communication system. As used herein, a "collaboration affordance" or a "collaboration identifier" includes indicia (such as still images, video, or audio/visual representations) that are representative of views of real-world collaboration opportunities, representative of actual collaborations being carried out by real-world teams working on projects. As used herein, the term "real-world" is meant to distinguish over the virtualized representations or groupings of users in a virtualized workspace system. In some embodiments, the collaboration discovery display area is an ad hoc display area for ambient collaboration opportunities as they arise from time to time in a particular group-based communication system. In general, such collaboration opportunities are not bounded or ordered by group-based communication system channels or workspaces. Specifically, a collaboration opportunity is a synchronous multimedia collaboration session that may be initiated by any user, and that may generate an invitation to any user, whether a member of the group-based communication system or external thereto. In some embodiments, adding an external user to a collaboration opportunity will require the external user to join the particular group-based communication system, and in alternative embodiments, the external user may be joined without becoming a member. In some such alternative embodiments, the external users receive a link via text or email and are presented with a user interface component that renders a user experience consistent with embodiments of the present invention. In some embodiments, a collaboration opportunity may be initiated and otherwise be generally dormant until a quorum of invited participants either joins the session or otherwise begins collaborating such that the audio stream becomes active. In such a scenario, to reflect the present state of inactivity in the audio stream, music, comfort noise, or other sounds may be injected into the audio stream until the collaboration session begins. For example, metadata associated with the session may be used to seed an audio streaming service to provide relevant music or other audio content while the corresponding audio stream is otherwise dormant.

Next, at step 604, an instruction is received from a user participating in a collaboration opportunity, via the user interface, to initiate a synchronous multimedia collaboration session. For example, the user may select a control within a synchronous multimedia collaboration session pane to initiate the synchronous multimedia collaboration session. In some embodiments, any user of the group-based communication system can initiate a synchronous multimedia collaboration session. In other embodiments, only specific users or users with particular permission levels can initiate a synchronous multimedia collaboration session. In still other embodiments, users who have received an invitation (by text message or email for example) can initiate synchronous multimedia collaboration sessions. In some embodiments, a user may indicate a type of multimedia for the synchronous multimedia collaboration session. For example, the user may select audio-only or audio-video. In some embodiments, the synchronous multimedia collaboration session is rendered immediately. In other embodiments, the user may additionally specify a delayed start for the synchronous multimedia collaboration session. For example, the user might indicate that the synchronous multimedia collaboration session should start in one minute, two minutes, three minutes, or five minutes to allow other participants a chance to prepare for participation.

Processing then proceeds (after the specified delay interval, if indicated) to step 606. At step 606, the group-based communication system establishes a synchronous multimedia collaboration session among the various allowed participants as established by an initiator of the synchronous multimedia collaboration session. In some embodiments, all active (or all users regardless of active status) participants are added to the synchronous multimedia collaboration session. In some other embodiments, users are added based on a user-availability status of a particular user based on whether a particular user is available and any associated user profile configuration parameters designating whether a user should be joined for a particular user-availability status. In various embodiments, a user is automatically joined or provided a link to join only if the associated channel is a public channel or a private channel to which the user has access.

In some embodiments, coworking sessions between two or more coworking users may be established. In some such embodiments, such a session is established in that at least one of the coworking users selects one or more of a plurality of collaboration components as presented in connection with a display associated with a group-based communication system interface. In these embodiments, the group-based communication system interface detects selection of a collaboration component. In response to detecting selection of the collaboration component, a display of the group-based communication system client renders an interactive collaboration user interface. The collaboration user interface may be associated with the collaboration component in a collaboration pane. A collaboration pane may be portion of the display area in which the coworking is carried out, i.e., where separate live cursors designate portions of a shared user interface being worked on by the two or more coworking users. The interactive collaboration user interface is then engageable by one or more participants of the plurality of participants.

In some embodiments, participants are added in receive-only mode. In other embodiments, each participant is joined, not joined, or joined in receive-only mode based on a preconfigured preference of the user or based on one or more available-user statuses. In still other embodiments, users are prompted for a join mode when the synchronous multimedia collaboration session is established and can choose to receive only or send and receive for each media type in the synchronous multimedia collaboration session.

In addition to users automatically joined to a particular session (or who choose to join the synchronous multimedia collaboration session when prompted upon creation), users may switch into (or switch out of) the synchronous multimedia collaboration session at any point during a particular synchronous multimedia collaboration session. In some embodiments, users may automatically be joined to (or be automatically prompted to join) the synchronous multimedia collaboration session when they select the associated collaboration opportunity for viewing in the group-based communication system. In some embodiments, a user may elect to anonymously audit a preview of a collaboration session for a certain amount of time if that user has permission to join the session, for example ten seconds. Such a preview audit of a synchronous multimedia collaboration session may permit a user to determine whether the subject matter of sufficient interest to merit joining the synchronous multimedia collaboration session. If the user decides not to join, the anonymous nature of the preview will be such that it does not unnecessarily disrupt the synchronous multimedia collaboration session. Similarly, in some embodiments, users may automatically be removed from the synchronous multimedia collaboration session (or be prompted to leave) upon viewing a different collaboration opportunity in the group-based communication system. In this way, the synchronous multimedia collaboration session provides ad hoc, ambient audio (or other multimedia content, such as a shared whiteboard) to the group-based communication system, enhancing spontaneous collaboration between users of the group-based communication system and any other user with whom such users may choose to collaborate.

At step 608, a synchronous multimedia collaboration session pane is rendered and/or displayed in the user interface. In some embodiments, as part of rendering the multimedia collaboration session pane, a synchronous multimedia collaboration application is executing, and associated contents are rendered within the pane. Similarly, user input is received within the pane and transmitted to the associated synchronous multimedia collaboration application. This pane may be displayed before step 602, after step 606, or at any other point in time. The synchronous multimedia collaboration session pane displays identifiers for a plurality of participating and non-participating users (for example, participating and non-participating members of the group-based communication system). In some embodiments, the participating users are displayed so as to indicate whether each user is participating or non-participating. For example, participating users and non-participating users may be displayed separately. In some embodiments, participating users are shown in a first section and non-participating users are shown in a separate section. In some embodiments, users are displayed with one or more status icons to indicate a capacity in which each user had joined the synchronous multimedia collaboration session. In some embodiments, the synchronous multimedia collaboration session pane is updated in real time to reflect the state of the synchronous multimedia collaboration session as users join, leave, and switch between multimedia modes.

Finally, at step 610, one or more user-availability status identifiers associated with one or more available users is displayed. Thereafter, an instruction to invite one or more internal or external users is received based at least in part on a user-availability status of a user to be invited. In some embodiments, a particular user-availability status for a particular user is determined based on a type of software application with which the particular user is presently engaged. User engagement may be determined by a software application that is in focus on a computing device being used by the user. For example, if a user is engaged with a document preparation software application, the user may be assigned a user-availability status of "focused" (performing focused work, i.e., authoring a document). In some embodiments, a user-availability status may be finer-grained such that if the user is writing in a document based on a particular document template, an associated user-availability status may be "focused" (working on a proposal) or "focused" (working on a performance review), for example. In some other embodiments, a user may specify user profile configuration parameters to refine how user-availability statuses are presented. For example, certain users may want to present a free-to-talk status at any time that the user is engaged with a software development tool such as a source-code editor. On the other hand, some other users may exclusively want to specify a user-availability status of "do-not-disturb" whenever such user is engaged with a source-code editor application.

In some embodiments, a team-wide view is provided analogously to looking around an office. In these embodiments, the team-wide view shows other group-based communication system users with which a particular user has collaborated with previously that are also available, including a rich status regarding the various users' availability and what activities in which the users are currently engaged. Such a team-wide view has an additional benefit of facilitating gathering a group of users into a synchronous multimedia collaboration session with minimal user interaction on the part of an organizing user. In some other embodiments, a company-wide entry point is provided to provide company-wide visibility to ongoing synchronous multimedia collaboration sessions. In these embodiments, a collaboration hub is provided where one can view all currently active synchronous multimedia collaboration sessions, including an optional synopsis of each of the active synchronous multimedia collaboration sessions and an associated transcript or summary of a transcript of a corresponding synchronous multimedia collaboration session.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for facilitating multimedia collaboration in a group-based communication system, the method comprising:

displaying, in a user interface for the group-based communication system, one or more collaboration affordances associated with one or more collaboration actions associated with a group of collaborating users in the group-based communication system;

responsive to receiving a first selection of a collaboration affordance of the one or more collaboration affordances, initiating a synchronous multimedia collaboration session between a plurality of participants;

rendering, for display in conjunction with the synchronous multimedia collaboration session, one or more collaboration panes in the user interface for the group-based communication system, the one or more collaboration panes displaying a plurality of collaboration components associated with the synchronous multimedia collaboration session, individual ones of the plurality of collaboration components indicating different types of information associated with the synchronous multimedia collaboration session, including active participants that are at least one of listening to the synchronous multimedia collaboration session, participating in use of a shared application, or sharing an audio or video stream;

detecting a second selection of a collaboration component of the plurality of collaboration components; and in response to detecting the second selection of the collaboration component, rendering, for display, an interactive collaboration user interface associated with the collaboration component in a collaboration pane of the one or more collaboration panes, wherein the interactive collaboration user interface is simultaneously engageable by one or more participants of the plurality of participants.

2. The one or more non-transitory computer-readable media of claim 1, wherein the group of collaborating users includes at least one member of the group-based communication system and one non-member of the group-based communication system.

3. The one or more non-transitory computer-readable media of claim 1, wherein the synchronous multimedia collaboration session comprises an audio session and a screen share.

4. The one or more non-transitory computer-readable media of claim 1, wherein the method further comprises:
  displaying, in the user interface for the group-based communication system, one or more user-availability status identifiers associated with one or more available users in the group-based communication system; and
  responsive to receiving, from a first user of the group-based communication system and via the user interface, an affordance to invite a second user to the synchronous multimedia collaboration session, based on the a user-availability status of the second user.

5. The one or more non-transitory computer-readable media of claim 1, wherein the method further comprises:
  displaying, in the user interface for the group-based communication system, a view of available synchronous multimedia collaboration sessions corresponding to one or more active synchronous multimedia collaboration sessions to which a user has permission to join.

6. The one or more non-transitory computer-readable media of claim 1, wherein the method further comprises:
  displaying, in the user interface for the group-based communication system, a preview affordance corresponding to a predetermined amount of time, wherein the preview affordance provides a preview of an active synchronous multimedia collaboration session.

7. A method for facilitating synchronous multimedia collaboration in a group-based communication system, the method comprising:
  displaying, in a user interface for the group-based communication system, one or more collaboration affordances associated with one or more collaboration actions associated with a group of collaborating users in the group-based communication system;
  responsive to receiving a first selection of one a collaboration affordance of the one or more collaboration affordances, initiating a synchronous multimedia collaboration session between a plurality of participants;
  rendering, for display in conjunction with the synchronous multimedia collaboration session, one or more collaboration panes in the user interface for the group-based communication system, the one or more collaboration panes displaying a plurality of collaboration components associated with the synchronous multimedia collaboration session, individual ones of the plurality of collaboration components indicating different types of information associated with the synchronous multimedia collaboration session, including active participants that are at least one of listening to the synchronous multimedia collaboration session, participating in use of a shared application, or sharing an audio or video stream;
  detecting a second selection of a collaboration component of the plurality of collaboration components; and
  in response to detecting the second selection of the collaboration component, rendering, for display, an interactive collaboration user interface associated with the collaboration component in a collaboration pane of the one or more collaboration panes, wherein the interactive collaboration user interface is simultaneously engageable by one or more participants of the plurality of participants.

8. The method of claim 7, wherein the group of collaborating users includes at least one member of the group-based communication system and one non-member of the group-based communication system.

9. The method of claim 7, wherein the synchronous multimedia collaboration session comprises an audio session and a screen share.

10. The method of claim 7 further comprising:
  displaying, in the user interface for the group-based communication system, one or more user-availability status identifiers associated with one or more available users in the group-based communication system; and
  responsive to receiving, from a first user of the group-based communication system and via the user interface, an affordance to invite a second user to the synchronous multimedia collaboration session, based on a user-availability status of the second user.

11. The method of claim 7 further comprising:
  displaying, in the user interface for the group-based communication system, a view of available synchronous multimedia collaboration sessions corresponding to one or more active synchronous multimedia collaboration sessions to which a user has permission to join.

12. The method of claim 7 further comprising:
  displaying, in the user interface for the group-based communication system, a preview affordance corresponding to a predetermined amount of time, wherein the preview affordance provides a preview of an active synchronous multimedia collaboration session.

13. A system comprising at least one processor and at least one non-transitory memory storing computer executable instructions that when executed by the at least one processor cause the system to carry out actions comprising:
  displaying, in a user interface for a group-based communication system, one or more collaboration affordances associated with one or more collaboration actions associated with a group of collaborating users in the group-based communication system;
  responsive to receiving a first selection of a collaboration affordance of the one or more collaboration affordances, initiating a synchronous multimedia collaboration session between a plurality of participants; and
  rendering, for display in conjunction with the synchronous multimedia collaboration session, one or more collaboration panes in the user interface for the group-based communication system, the one or more collaboration panes displaying a plurality of collaboration components associated with the synchronous multimedia collaboration session, individual ones of the plurality of collaboration components indicating different types of information associated with the synchronous multimedia collaboration session, including active participants that are at least one of listening to the synchronous multimedia collaboration session, participating in use of a shared application, or sharing an audio or video stream;
  detecting a second selection of a collaboration component of the plurality of collaboration components; and
  in response to detecting the second selection of the collaboration component, rendering, for display, an interactive collaboration user interface associated with the collaboration component in a collaboration pane of the one or more collaboration panes, wherein the interactive collaboration user interface is simultaneously engageable by one or more participants of the plurality of participants.

14. The system of claim 13, wherein the group of collaborating users includes at least one member of the group-based communication system and one non-member of the group-based communication system.

15. The system of claim 13, wherein the synchronous multimedia collaboration session comprises an audio session and a screen share.

16. The system of claim 13, wherein the actions further comprise:
displaying, in the user interface for the group-based communication system, one or more user-availability status identifiers associated with one or more available users in the group-based communication system; and
responsive to receiving, from a first user of the group-based communication system and via the user interface, an affordance to invite a second user to the synchronous multimedia collaboration session, based on a user-availability status of the second user.

17. The system of claim 13, wherein the actions further comprise:
displaying, in the user interface for the group-based communication system, a view of available synchronous multimedia collaboration sessions corresponding to one or more active synchronous multimedia collaboration sessions to which a user has permission to join.

18. The one or more non-transitory computer-readable media of claim 1, wherein the method further comprises:
responsive to an actuation of an affordance by a participant of the plurality of participants, creating an asynchronous collaboration thread associated with the synchronous multimedia collaboration session and accessible to the plurality of participants for sending and receiving group-based communication system messages.

19. The method of claim 7, further comprising:
responsive to an actuation of an affordance by a participant of the plurality of participants, creating an asynchronous collaboration thread associated with the synchronous multimedia collaboration session and accessible to the plurality of participants for sending and receiving group-based communication system messages.

20. The system of claim 13, wherein the actions further comprise:
responsive to an actuation of an affordance by a participant of the plurality of participants, creating an asynchronous collaboration thread associated with the synchronous multimedia collaboration session and accessible to the plurality of participants for sending and receiving group-based communication system messages.

* * * * *